US006597675B1

(12) United States Patent
Esmailzadeh et al.

(10) Patent No.: US 6,597,675 B1
(45) Date of Patent: Jul. 22, 2003

(54) RANDOM ACCESS IN A MOBILE TELECOMMUNICATIONS SYSTEM

(75) Inventors: Riaz Esmailzadeh, Yokohama (JP); Karim Jamal, Stockholm (SE); Christiaan Roobol, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/148,224

(22) Filed: Sep. 4, 1998

Related U.S. Application Data

(63) Continuation-in-part of application No. 08/847,655, filed on Apr. 30, 1997, now Pat. No. 6,163,533.

(51) Int. Cl.[7] .............................................. H04B 7/216
(52) U.S. Cl. ...................................... 370/335; 370/515
(58) Field of Search ................................. 370/320, 328, 370/329, 330, 335, 342, 345, 350, 503, 515; 375/130, 135, 136, 137, 143, 145, 147, 149, 152

(56) References Cited

U.S. PATENT DOCUMENTS 6,259,724 B1 * 7/2001 Esmailzadeh ............... 375/143

FOREIGN PATENT DOCUMENTS

| EP | 0633671 A2 | 1/1995 | ............ H04B/7/26 |
| WO | 9818280 | 4/1998 | ............ H04Q/7/38 |

OTHER PUBLICATIONS

IEEE Journal on Selected Areas in Communications, USA, "Design Study for a CDMA–Based Third–Generation Mobile Radio System," A. Baier et al., vol. 12, No. 4, May 1994, pp. 733–743, XP000588850.

Standard Search Report for RS 101653 US completed May 26, 1999.

* cited by examiner

*Primary Examiner*—Kwang Bin Yao
(74) *Attorney, Agent, or Firm*—Jenkens & Gilchrist, P.C.

(57) ABSTRACT

A method is disclosed for processing mobile-originated random access requests in a mobile telecommunications system that randomly selects new signatures for re-transmissions in the event that collisions have occurred. As such, the random access re-transmissions are randomized over the signature domain instead of just over the time domain. Consequently, the disclosed invention significantly shortens random access delays caused by collisions or erroneous arrivals at base station receivers, and also significantly reduces the interval between random access re-transmissions.

20 Claims, 4 Drawing Sheets

RA packets:

■☐ Initial RA attempt

■◣ Re-transmission

Signature associated with the RA, different shading indicates different signature $\tau_d$=time-out period

RANDOM ACCESS IN A MOBILE TELECOMMUNICATIONS SYSTEM

RELATED APPLICATIONS

This application is a continuation-in-part of, and claims priority from U.S. patent application Ser. No. 08/847,655 now U.S. Pat. No. 6,163,533 to Esmailzadeh et al., which was filed Apr. 30, 1997 and is incorporated herein in its entirety.

This application is also related by subject matter to commonly-assigned-U.S. patent application Ser. No. 08/733,501, now U.S. Pat. No. 6,259,724 which was filed Oct. 18, 1996.

BACKGROUND OF THE INVENTION

1. Technical Field of the Invention

The present invention relates generally to the mobile telecommunications field and, in particular, to a method for processing multiple random access mobile-originated calls.

2. Description of Related Art

The next generation of mobile communications systems will be required to provide a broad selection of telecommunications services including digital voice, video and data in packet and channel circuit-switched modes. As a result, the number of calls being made is expected to increase significantly, which will result in much higher traffic density on random access channels (RACHs). Unfortunately, this higher traffic density will also result in increased collisions and access failures. Consequently, the new generation of mobile communications systems will have to use much faster and flexible random access procedures, in order to increase their access success rates and reduce their access request processing times.

In most mobile communications systems, such as, for example, the European joint development referred to as the "Code Division Testbed" (CODIT), a mobile station can gain access to a base station by first determining that the RACH is available for use. Then, the mobile station transmits a series of access request preambles (e.g., single 1023 chip symbols) with increasing power levels, until the base station detects the access request. In response, the base station starts the process of controlling the mobile station's transmitted power via a downlink channel. Once the initial "handshaking" between the mobile station and base station has been completed, the mobile user transmits a random access message.

More specifically, in a CODIT-based Code Division Multiple Access (CDMA) system, a mobile station will attempt to access the base station receiver by using a "power ramping" process that increases the power level of each successive transmitted preamble symbol. As soon as an access request preamble is detected, the base station activates a closed loop power control circuit, which functions to control the mobile station's transmitted power level in order to keep the received signal power from the mobile station at a desired level. The mobile station then transmits its specific access request data. The base station's receiver "despreads" the received (spread spectrum) signals using a matched filter, and diversity-combines the despread signals to take advantage of antenna diversity.

In an IS-95 CDMA system, a similar random access technique is used. However, the primary difference between the CODIT and IS-95 process is that the IS-95 mobile station transmits a complete random access packet instead of just the preamble. If the base station does not acknowledge the access request, the IS-95 mobile station re-transmits the access request packet at a higher power level. This process continues until the base station acknowledges the access request.

In a mobile communications system using a slotted ALOHA (S-ALOHA) random access scheme, such as the method disclosed in the above-described U.S. patent application Ser. No. 08/733,501 (hereinafter, "the '501 Application"), a mobile station generates and transmits a random access packet. A diagram that illustrates a frame structure for such a random access packet is shown in FIG. 1. The random access packet ("access request data frame") comprises a preamble and a data field portion. The preamble contains a unique signature (bit) pattern, which is "L" symbols long. The signature pattern is randomly selected from a set of patterns that are, but not necessarily, orthogonal to each other. Note that although the random access request packet shown in FIG. 1 is described herein as including a preamble with a signature field, this description is exemplary and for illustrative purposes only, but not intended as a limitation. As such, the unique signature patterns can be transmitted in a different way (e.g., not within a preamble, integrated into the control channel, in parallel with a data field, etc.). As such, the use of this unique signature pattern feature, as described and claimed in the '501 Application, provides a significantly higher throughput efficiency than prior random access schemes.

As described in the '501 Application, the data field of the random access packet includes certain random access information, including mobile (user) identity information, required service number (number of services to be provided), required air time (time needed to complete a message), short packet data message (to increase transmission efficiency), and an error detection redundancy field (cyclic redundancy code). For reasons elaborated in the '501 Application, the spreading ratio (spread spectrum modulation) of the preamble is selected to be longer than the spreading ratio of the data field portion. However, situations may be envisioned in which this is not necessarily so.

The random access packet (e.g., such as the packet shown in FIG. 1) is transmitted by the mobile station at the beginning of the next available slot. A block diagram of an apparatus that can be used in a mobile station to generate and transmit the random access packet illustrated in FIG. 1 is shown in FIG. 2. Essentially, as illustrated by FIG. 2, the preamble and data field of the random access packet are generated and spread separately (with respective spreading codes) and then multiplexed and transmitted by the mobile station.

Next, the random access packet transmitted by the mobile station is received and demodulated at the target base station with a matched filter-based receiver. FIG. 3 is a block diagram of a detection section (for one antenna) of a base station's random access receiver, which functions primarily to estimate the timing of the received signal rays. The matched filter, which is used only during the preamble period, is tuned to the preamble's spreading code. The matched filter is used to detect the presence of the random access request, and despread the preamble part of the random access packet and feed it to the accumulator unit. The accumulator (signatures 1-l) is a unique feature used for the '501 Application's random access method to sum the signals at the output of the matched filter during the preamble's (M) symbol periods, in order to increase the received signal-to-interference (S/I) power ratio. Since each received preamble comprises a unique signature pattern, the accumulation operation is carried out with a plurality of accumulators (1-l), with each accumulator tuned to one of the possible signature patterns to be received.

FIG. 4 is a simple block diagram of an accumulator that can be used for the I channel (quadrature detection) in the random access detector section shown in FIG. 3. A similar accumulator can be used for the Q channel. Referring to FIGS. 3 and 4, the output of each accumulator (signature 1-l) is coupled to a peak detection unit. At the end of the preamble period, each peak detection unit searches the output of its respective matched filter for each signal peak that exceeds a predetermined detection threshold. Each peak detection unit then registers (detects and stores) the magnitude and relative phase of each of those peak signals, and thereby determines the number of significant signal rays available for demodulation in the receiver. As such, the timing of each peak is estimated and used to set the receiver's "Rake" parameters (Rake receiver sections 1-l). FIG. 5 is a block diagram of a random access demodulator that can be used to demodulate the data field portion of the random access packet. Essentially, the random access demodulator section decodes the data information in the received data field and checks for transmission errors.

Notably, although the random access apparatus and method described above with respect to FIGS. 1–5 has numerous advantages over prior random access schemes, a number of problems still exist that remain to be solved. For example, a large number of packet collisions may occur if mobile stations in all of the cells use the same. spreading codes during the preamble or data field processing stage. As a consequence, an excessive number of the random access requests will have to be re-transmitted, which can lead to system instability. Moreover, using the random access apparatus and method described above, since the random access requests are transmitted at the beginning of the next time slot, the base station's matched filter receiver is not utilized as efficiently as it can be, because the matched filter receiver is idle for the complete period subsequent to the preamble reception stage. Additionally, since the length of the random access packet used with the above-described scheme is fixed, the size of the short data packets is restricted by the extent of use of the remainder of the packet. For all of these reasons, a more flexible random access request procedure is needed to resolve these problems. As described below with respect to FIGS. 6–8, U.S. patent application Ser. No. 08/847,655 (hereinafter, the "'655 Application") successfully resolves the above-described problems.

Nevertheless, other random access problems still exist that need to be solved. For example, FIG. 9 is a time sequence diagram that illustrates how two or more random access requests can collide when they arrive simultaneously at a base station receiver. In order to minimize the number of collisions occurring during re-transmissions, the mobile station's time-out period (time elapsed before re-transmitting a request) can be randomly selected from within a relatively long time interval $\{0, T_d\}$, where $T_d$ is the maximum allowable time delay. The use of a relatively long time interval between re-transmissions reduces the probability of collisions. However, the average delay encountered waiting for a successful random access transmission can be rather long. Furthermore, although use of the random access methods in the above-described patent applications are highly advantageous over prior methods, random access collisions can still occur when two or more random access requests that contain the same signature pattern arrive simultaneously at the base station receiver. Nevertheless, as described in detail below with respect to FIG. 10, the present invention successfully resolves these and other related random access problems.

SUMMARY OF THE INVENTION

It is, therefore, an object of the present invention to utilize random access channels more efficiently.

It is another object of the present invention to be capable of receiving a significantly higher number of random access requests per matched filter than received by conventional means.

It is yet another object of the present invention to reduce the probability of collisions between random access requests and also minimize their loss.

It is still another object of the present invention to be capable of selecting the length of a data field in a random access request packet to allow increased flexibility in selecting the length of a short packet field.

It is yet another object of the present invention to provide a random access packet that can be used to quickly establish long data or voice calls.

It is still another object of the present invention to maintain a low level of cross-correlation between random access attempts made from neighboring cells.

Still another object of the present invention is to significantly shorten random access delays caused by random access request collisions or erroneous random access request arrivals at base station receivers.

Yet another object of the present invention is to significantly reduce the time interval between random access re-transmissions and thereby increase throughput efficiency.

In accordance with the invention described and claimed in the '655 Application, the foregoing and other objects are achieved by a method that assigns each cell a unique preamble spreading code and a unique long-code which is concatenated with a short spreading code associated with a randomly selected signature, and is used to spread the data part of a random access packet. The period selected for the long-code can be relatively long in duration (e.g., up to hours or days in length). Also, the widths of the transmission time slots are set equal to the length of the preambles. Consequently, the mobile station's random access requests can be timed to start at the beginning of the slots, and detected during the preamble periods by the matched filter in the base station's random access receiver. The data field of the mobile station's random access request is transmitted in the slots following the preamble and received by the rake receiver at the base station. However, subsequent to the preamble period, the matched filter is still enabled to receive the preambles of other random access requests. Therefore, the matched filter can be utilized continuously and more efficiently, and a significantly larger number of random access requests can be processed in comparison with prior random access schemes. As such, the communications throughput and efficiency of a random access system using the present method are substantially higher than the throughput and efficiency of prior random access systems.

Additionally, the length of the data field is not restricted. The method of concatenated spreading of the data field portion of the random access packet allows a user to generate a packet which is as long as desired. Moreover, the concatenated spreading removes the danger that the resulting packet will collide with other random access request packets, since the spreading pattern and/or its phase are unique.

In accordance with the present invention, the foregoing and other objects are achieved by a method that randomly selects new signatures for random access re-transmissions when collisions have occurred. As such, the present invention randomizes the re-transmission of random access requests over a signature domain instead of just over the time domain. Consequently, the present invention significantly shortens the random access delays caused by collisions or erroneous arrivals of random access requests at base station receivers, and also significantly reduces the time interval between random access re-transmissions. The present invention thus increases random access system throughput efficiency in comparison to prior random access approaches.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
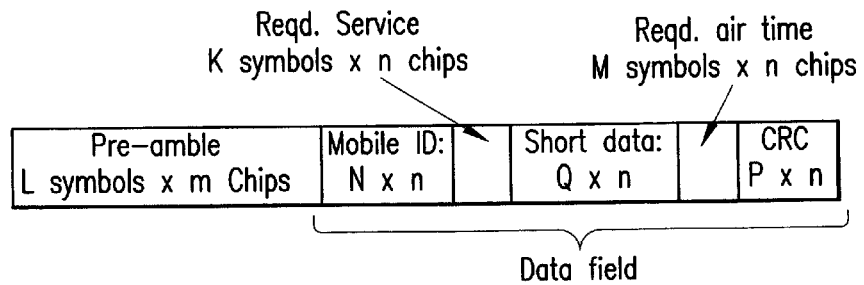
FIG. 1 is a diagram that illustrates a frame structure for a random access packet.
Figure 2:
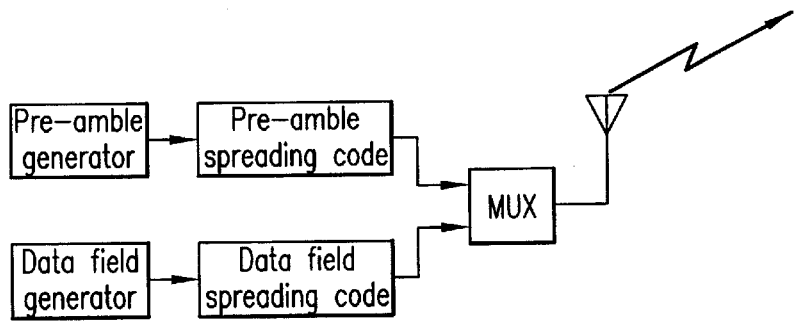
FIG. 2 is a block diagram of an apparatus that can be used in a mobile station to generate and transmit the random access packet illustrated in FIG. 1.
Figure 3:
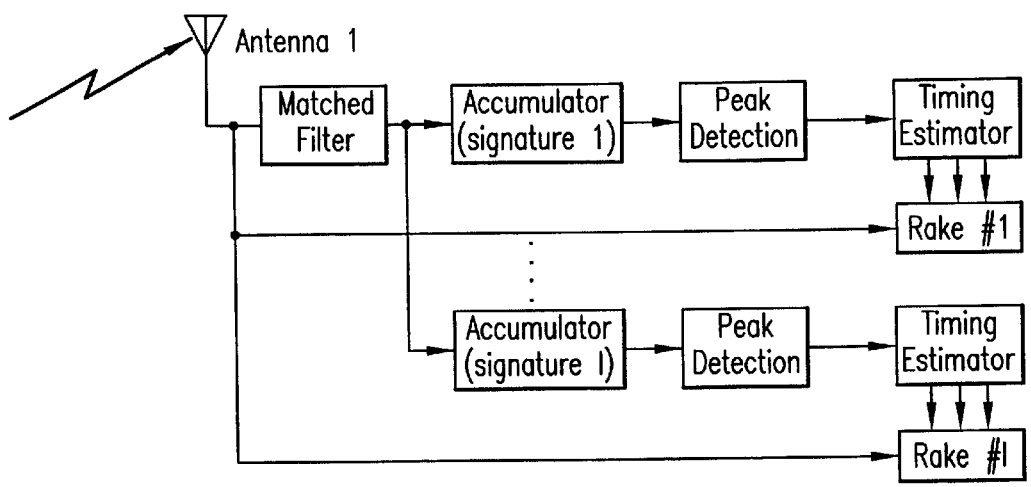
FIG. 3 is a block diagram of a detection section (for one antenna) of a base station's random access receiver, which functions primarily to estimate the timing of the received signal rays.
Figure 4:
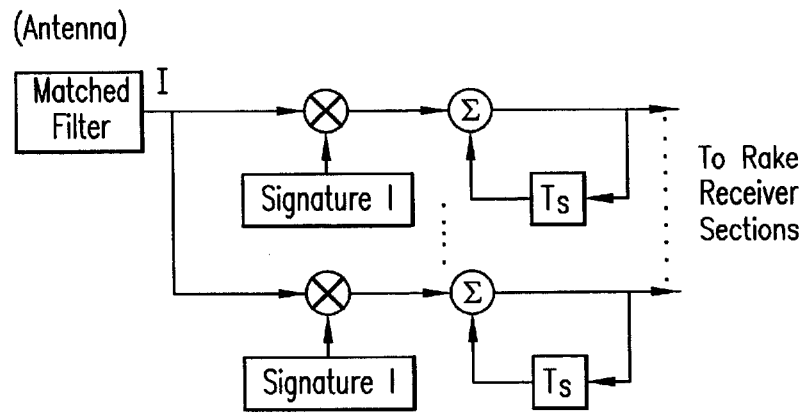
FIG. 4 is a simple block diagram of an accumulator that can be used for the I channel (quadrature detection) in the random access detector section shown in FIG. 3.
Figure 5:
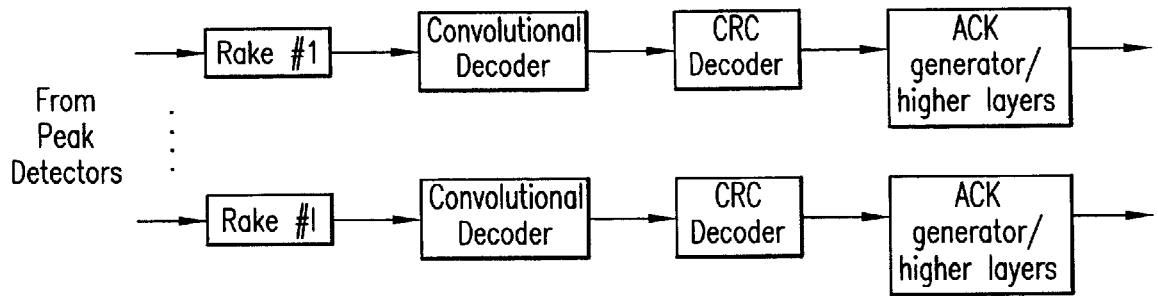
FIG. 5 is a block diagram of a random access demodulator that can be used to demodulate the data field portion of a random access packet.

The preferred embodiment of the present invention and its advantages are best understood by referring to FIGS. 1–10 of the drawings, like numerals being used for like and corresponding parts of the various drawings.

Essentially, in accordance with the invention described and claimed in the '655 Application, the method assigns each cell a unique preamble spreading code, and also a unique long-code which is concatenated with the data field's (signature-associated) short spreading code. The period selected for the long-code can be relatively long in duration (e.g., up to hours or days in length). Consequently, it can be said that the data field of the random access packet is transmitted in a dedicated channel, because no two messages can have the same spreading sequence and phase unless they have chosen the same signature and transmitted their preambles at the same time. This results in a collision of the packets, and renders these random access attempts unsuccessful. However, as described in detail below with respect to FIG. 10, this problem is solved by the present invention. Notably, this method of assigning cell-unique spreading codes and long-codes provides a significantly low probability of collision between multiple access random attempts in neighboring cells.

Also in accordance with the invention in the '655 Application, the method sets the widths of the transmission time slots equal to the length of the preamble (minus, for practical purposes, a predefined guard time). Consequently, the mobile station's random access request can be timed to start at the beginning of the slot, and detected during the preamble period by the matched filter in the base station's random access receiver. The data field of the mobile station's random access request is transmitted in the slots succeeding that of the preamble and received by the rake receiver at the base station. However, with the present method, subsequent to the preamble period, the matched filter is enabled to receive the preambles of other random access requests made by other mobile stations. Therefore, in accordance with the invention described and claimed in the '655 Application, the matched filter can be utilized continuously and efficiently, and a significantly larger number of random access requests can be processed in comparison with prior random access schemes. As such, the communications throughput and efficiency of a random access system using that method are significantly higher than the throughput and efficiency of prior random access systems.

Furthermore, in accordance with the method described and claimed in the '655 Application, the length of the data field is not restricted. In other words, the method of concatenated spreading of the data field portion of the random access packet allows a user to generate a packet which is as long as desired. Moreover, in using this concatenated spreading approach, there is less danger that the resulting packet will collide with other random access request packets.

In accordance with the present invention, a method for processing random access requests in a mobile telecommunications system is provided that randomly selects new signatures for re-transmissions when collisions have occurred. As such, the present invention randomizes the random access re-transmissions over a signature domain instead of just over the time domain. Consequently, the present invention significantly shortens the random access delays caused by the re-transmission delays after collisions or erroneous arrivals of random access requests at base station receivers, and also significantly reduces the interval between random access re-transmissions.

Figure 6:
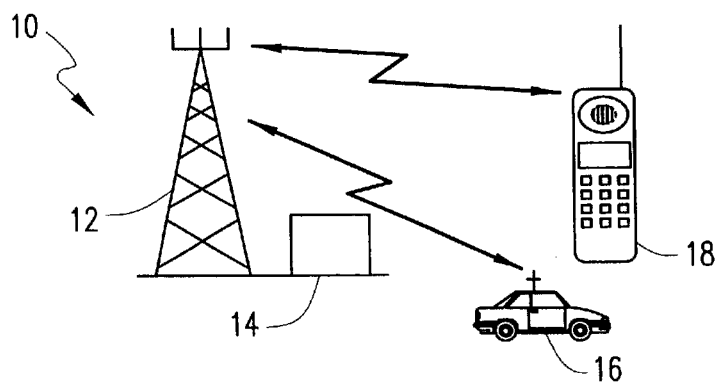
FIG. 6 is a block diagram of a pertinent section of a cellular communications system, which can be used to implement the method of the invention described and claimed in the '655 Application.

Referring now to FIG. 6 for a description of the invention in the '655 Application, a pertinent section of a cellular communications system 10 is shown, which can be used to implement the method of the present invention. System 10 includes a base station transmit/receive antenna 12 and transmitter/receiver section 14, and a plurality of mobile stations 16 and 18. Although only two mobile stations are shown, FIG. 6 is for illustrative purposes only, and the present invention can be assumed to include more than two mobile stations. Prior to generating and transmitting an access request frame, a mobile station (e.g., 16) acquires synchronization, or synchronizes, with a target base station receiver (14). The mobile station then determines the starting time for each slot from the base station's broadcast/pilot channel information. The mobile station also retrieves the number of the slot being processed from the broadcast/pilot channel information, which is to be used by the base station to tag its acknowledgment (ACK) message reply with the slot number to ensure that the correct mobile station receives the acknowledgment. More details for synchronizing a mobile station to a base station in a random access environment can be found in the '501 Application.

The target base station also transfers to the requesting mobile station(s) (e.g., over the downlink broadcast channel) each unique random access spreading code and long-code associated with each of the cells defined by the base station transceiver. For example, these unique spreading codes and long-codes can be Gold codes or Kasami codes. The mobile station stores the spreading code and long-code information in a memory storage area (not explicitly shown), which is to be retrieved and used by the mobile station to spread the preamble and data field of the random access request packets generated. Finally, the base station also transfers to the requesting mobile station(s) (e.g., in an appropriate broadcast message) the signature patterns associated with the preambles, which can be used to help distinguish between different cells.

For example, as described and claimed in the '501 application, in order to enable the base station receiver to more effectively distinguish between multiple random access requests, a preamble bit or symbol pattern is used. Each requesting mobile station can transmit one of L different preamble bit or symbol patterns ("signatures"). The different signature patterns used are, but not necessarily, orthogonal to each other. At the base station receiver, each of L accumulators is tuned to detect a specific signature coupled from the output of the receiver's matched filter. This signature preamble in a received signal is used by the base station receiver to effectively distinguish between simultaneous, different multiple access attempts made by the mobile stations.

Figure 7:
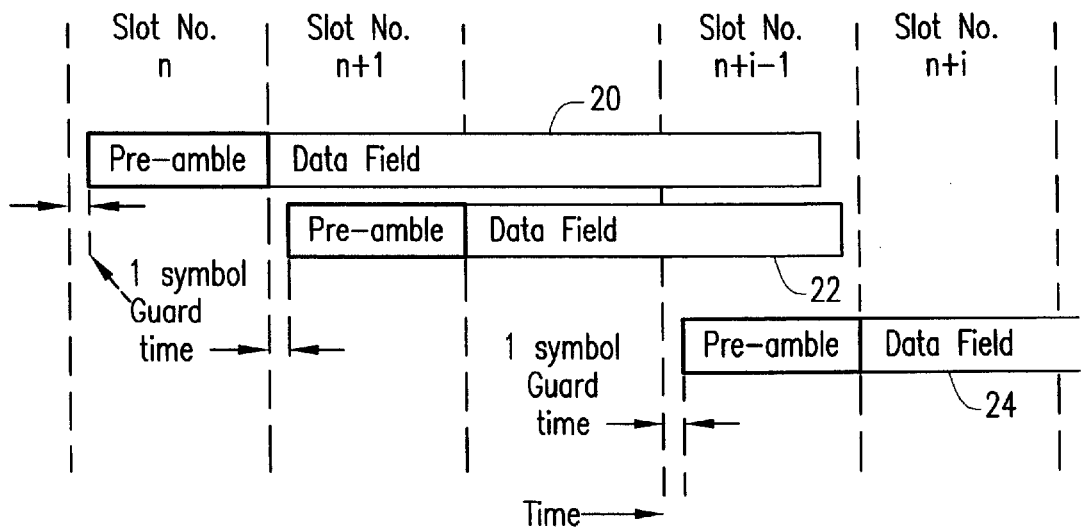
FIG. 7 is a diagram that illustrates the structure and timing of a plurality of random access request packets that can be transmitted by different mobile stations, in accordance with the preferred embodiment of the invention described and claimed in the '655 Application.

FIG. 7 is a diagram that illustrates the structure and timing of a plurality of random access request packets that can be transmitted by different mobile stations, in accordance with the preferred embodiment of the invention in the '655 Application. Although only three random access request packets are shown for illustrative purposes, that invention is not intended to be so limited and can include the transmission and reception of more than three such packets. Essentially, for each of the random access request packets shown (20, 22 and 24), the S-ALOHA procedure used with the present method applies only to the preamble portion of the random access request process. The length of each preamble (20, 22 and 24) is set equal to the width of the time slots (n, n+1, . . . , n+i), minus (for design purposes) a predefined guard time to minimize potential interference between slots. For example, in practice, a one symbol guard time can be used. Also, as shown, the lengths of the data field portions of the random access request packets (20, 22 and 24) can be varied according to the desired application, which provides mobile stations with flexibility in transmitting different length data fields.

In order to avoid collisions between any two random access attempts made by mobile stations in two different cells, or between two random access attempts made by mobile stations in adjacent cells, the following spreading method can be used. As described earlier, the mobile stations making the random access requests, each generate unique preambles using a cell specific spreading code (e.g., retrieved from a respective internal memory area). In practice, these codes can be reused for other cells which are separated by a sufficient distance.

Figure 8:
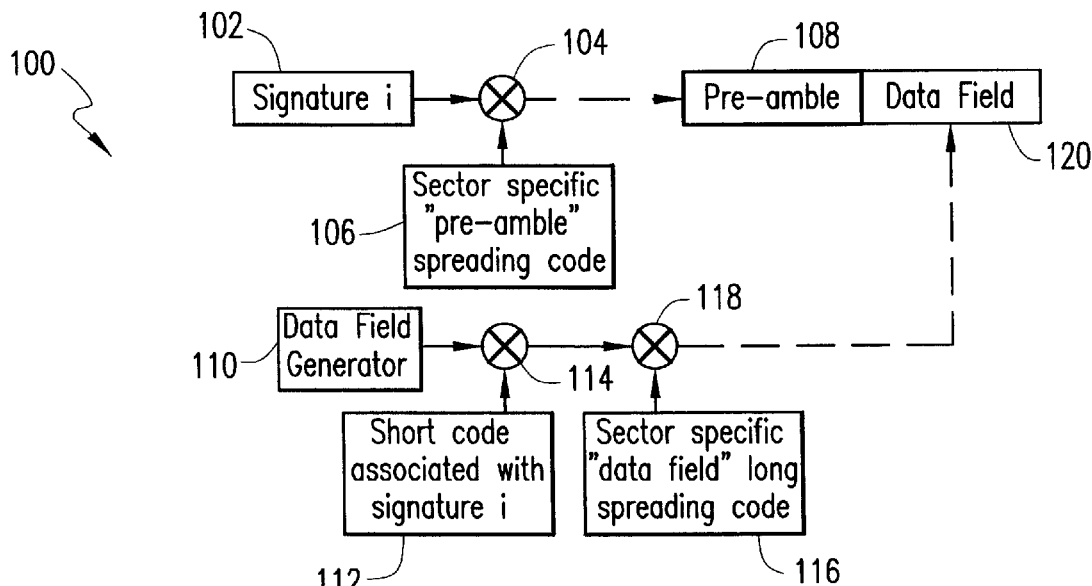
FIG. 8 is a simple block diagram of an apparatus that can be used to implement the method for use with a mobile station to generate and transmit a random access packet such as the random access packets shown in FIG. 7, in accordance with the preferred embodiment of the invention described and claimed in the '655 Application.
Figure 9:
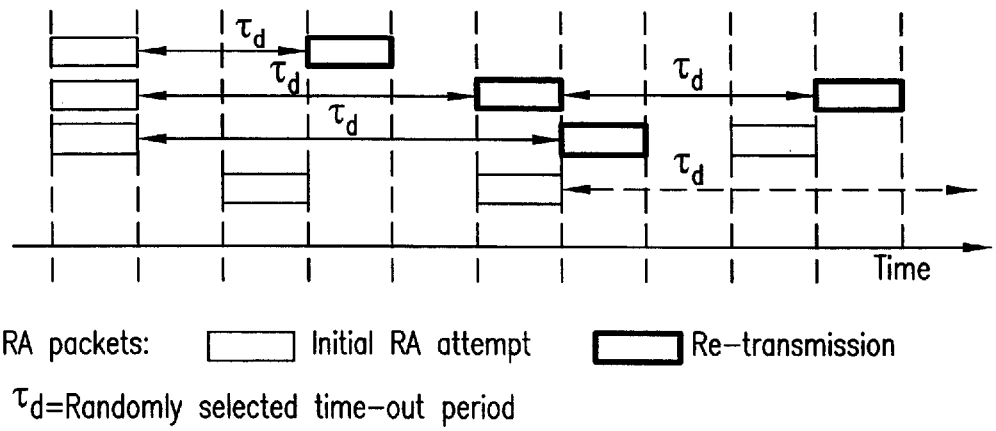
FIG. 9 is a time sequence diagram that illustrates how two or more random access requests can collide when they arrive simultaneously at a base station receiver.

FIG. 8 is a simple block diagram of an apparatus that can be used to implement the method for use with a mobile station to generate and transmit a random access packet such as the random access packets shown in FIG. 7, in accordance with the preferred embodiment of the invention in the '655 Application. In one embodiment, the method can be implemented under the control of a microprocessor (not explicitly shown) located in the mobile station. The random access packet generating apparatus 100 includes a signal mixer 104, which spreads a "signature i" 102 (e.g., retrieved from an internal memory area in the mobile station 18) with a specific preamble spreading code for the cell involved (e.g., also retrieved from the internal memory area) to form the cell specific preamble of the random access packet to be transmitted. The data field of the random access packet to be transmitted is generated with a data field generator 110. A mixer 114 spreads the generated data field with a unique short spreading code (112) associated with the "signature i". The resulting data field of the random access packet is then spread with a concatenated code, which can be constructed, for example, by a modulo-2 addition (by mixer 118) of the signature-associated short code (112) with a cell-specific long spreading code 116 (e.g., retrieved from an internal memory area). The length of the resulting data field (120) of the random access packet to be transmitted can be flexibly selected at the mobile station (e.g., hours or days long). The length of the resulting data field (120) can be varied at the mobile station, which provides an effective and quick way to establish long data or voice calls.

Figure 10:
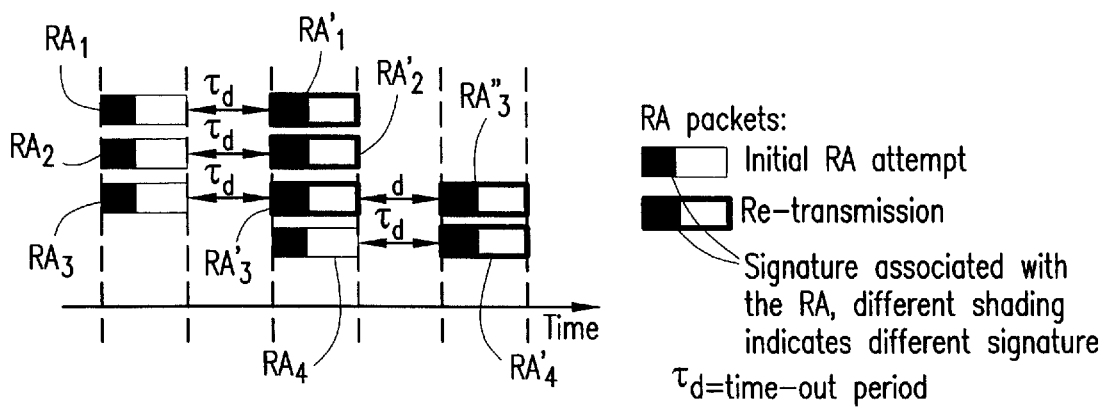
FIG. 10 is a time sequence diagram that illustrates how random access collisions and delays can be significantly reduced by randomly selecting signatures for re-transmissions, in accordance with a preferred embodiment of the present invention.

FIG. 10 is a time sequence diagram that illustrates how random access collisions and delays can be significantly reduced by randomly selecting signatures for re-transmissions, in accordance with a preferred embodiment of the present invention. In this exemplary embodiment, a random access request packet is re-transmitted with a new signature immediately after the originating mobile station has determined that the previously transmitted random access attempt was unsuccessful. For example, as described above with respect to FIGS. 1–8, each requesting mobile station has received from a target base station (e.g., in an appropriate broadcast message) and stored (in local memory) a plurality of signature patterns to be associated with the preambles of the random access request packets to be transmitted. These signature patterns (bits or symbols) can be orthogonal to each other, and are used by the base station receiver to distinguish between the different random access attempts made by the mobile stations. The requesting mobile station randomly selects (e.g., with an internal microprocessor) a signature and transmits a random access request packet with the selected signature included in the preamble of the packet. As illustrated by FIG. 10, each of four mobile stations have transmitted random access request packets ($RA_1$, $RA_2$, $RA_3$, $RA_4$) . Three of these random access request packets ($RA_1$, $RA_2$, $RA_3$) have arrived simultaneously at the base station receiver. Furthermore, all of these three mobile stations have selected the same signature. Therefore, the originating mobile stations for these three random access request packets will not receive an acknowledgment (ACK) message from the target base station indicating a successful access attempt (for this example, the target base station did not receive and detect these packets due to collisions) Consequently, in accordance with the present invention, each of the re-transmitting mobile stations selects a random signature again. In this way, the probability that the collision will occur again is reduced (statistically, each mobile station selects a different signature and re-transmits the original random access request packet with the second selected signature included in the preamble, such as, for example, $RA_1'$, $RA_2'$, $RA_3'$)

As shown in FIG. 10, it can be assumed that a random access attempt acknowledgment message has been received by the originating mobile stations for two of the re-transmitted packets (e.g., $RA_1'$, $RA_2'$), but no acknowledgment message has been received by the originating mobile station for the third re-transmission ($RA_3'$). For this example, the target base station did not receive and detect the third re-transmitted packet ($RA_3'$) due to its collision with the fourth random access request packet ($RA_4$), since both packets used the same signature. Consequently, the originating mobile station for each of these two random access request packets ($RA_3'$, $RA_4$) randomly selects another signature from each of the respective stored plurality of signatures, and re-transmits the original request with the new signature included in the preamble (e.g., $RA_3''$, $RA_4'$). These random access requests are then either received successfully at the target base station and thus acknowledged, or the re-transmission process of randomly selecting new signatures is continued.

Notably, as shown in FIG. 10, the time-out duration ($\tau_d$) between re-transmissions for a particular mobile station can be reduced to the minimum time needed for that particular mobile station to determine that the transmitted random access attempt was unsuccessful. As such, the time-out duration ($\tau_d$) between re-transmissions can be different for each originating mobile station. Accordingly, the present invention randomizes the random access re-transmissions for the mobile stations over the signature domain instead of just over the time domain. Consequently, the present invention significantly shortens the random access delays caused by collisions or erroneous arrivals at base station receivers, and also significantly reduces the interval between random access re-transmissions, which increases the random access system's throughput efficiency.

In another embodiment of the present invention, the random access re-transmissions for the mobile stations are again randomized over the signature domain (as in the above embodiment). However, in this exemplary embodiment, the mobile station attempting to gain access determines just when to re-transmit the random access request packet. For example, an algorithm executed in the mobile station (by a local microprocessor) can determine the elapsed time between the re-transmissions ($\tau_d$) while taking into consideration certain performance factors, such as power control, channel conditions, interference levels at the base station, type of service being requested, priority levels, etc. As such, the time-out period for a mobile station can vary according to operational conditions.

In yet another embodiment of the present invention, the random access re-transmissions for the mobile stations are randomized over both the signature domain and time domain. Consequently, the maximum time-out period ($\tau_d$) between transmissions is shorter than prior time-out periods. In other words, a signature for a random access request transmission can be selected at random from the set of available signatures provided by the target base station, and the time-out delay ($\tau_d$) can be selected at random from the interval $\{0, T_d\}$. Consequently, the time-out period ($\tau_d$) can be significantly shorter than prior art time-out periods.

Preferably, this exemplary embodiment is for those cases where the base station's set of available signatures is relatively small (i.e., relatively few signatures are available for use).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for processing random access requests in a mobile communications system, comprising the steps of:
    a mobile station transmitting a first random access request for receipt by a base station;
    said mobile station determining if said first random access request has been received by said base station; and
    if said mobile station determines that said first random access request has not been received, randomly selecting a signature code from a plurality of signature codes, associating said selected signature code with a signature field for said first random access request, and re-transmitting said first random access request with said signature field including said selected signature code.

2. The method of claim 1, wherein said selected signature code is orthogonal to at least one of said plurality of signature codes.

3. The method of claim 1, wherein said determining step comprises the step of waiting a predetermined time for an acknowledgment message from said base station.

4. The method of claim 3, wherein said predetermined time comprises a predetermined time-out interval.

5. The method of claim 3, wherein said predetermined time is determined by at least one network performance factor.

6. The method of claim 3, wherein said predetermined time is randomly selected by said mobile station.

7. The method of claim 6, wherein said predetermined time is randomly selected from a time-out interval $\{0, T_d\}$.

8. The method of claim 1, wherein said signature field comprises a preamble.

9. The method of claim 1, wherein said mobile communications system comprises a spread spectrum mobile communications system.

10. The method of claim 1, wherein said mobile communications system comprises a Code Division Multiple Access mobile communications system.

11. A system for processing random access requests in a mobile communications system, comprising:
    a base station; and
    a mobile station coupled to said base station by a radio air interface, said mobile station including:
        means for transmitting a first random access request for receipt by said base station;
        means for determining if said first random access request has been received by said base station; and
        means for randomly selecting a signature code from a plurality of signature codes, associating said selected signature code with a signature field for said first random access request, and re-transmitting said first random access request with said signature field including said selected signature code, if said mobile station determines that said first random access request has not been received.

12. The system of claim 11, wherein said selected signature code is orthogonal to at least one of said plurality of signature codes.

13. The system of claim 11, wherein said means for determining comprises means for waiting a predetermined time for an acknowledgment message from said base station.

14. The system of claim 13, wherein said predetermined time comprises a predetermined time-out interval.

15. The system of claim 13, wherein said predetermined time is determined by at least one network performance factor.

16. The system of claim 13, wherein said predetermined time is randomly selected by said mobile station.

17. The system of claim 16, wherein said predetermined time is randomly selected from a time-out interval $\{0, T_d\}$.

18. The system of claim 11, wherein said signature field comprises a preamble.

19. The system of claim 11, wherein said mobile communications system comprises a spread spectrum mobile communications system.

20. The system of claim 11, wherein said mobile communications system comprises a Code Division Multiple Access mobile communications system.

* * * * *